(12) United States Patent
Foda

(10) Patent No.: US 12,125,132 B2
(45) Date of Patent: Oct. 22, 2024

(54) METHOD AND COMPUTER DEVICE FOR 3D SCENE GENERATION

(71) Applicant: Acer Incorporated, New Taipei (TW)

(72) Inventor: Mohammad Foda, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 180 days.

(21) Appl. No.: 17/822,219

(22) Filed: Aug. 25, 2022

(65) Prior Publication Data

US 2024/0070959 A1 Feb. 29, 2024

(51) Int. Cl.
*G06T 15/00* (2011.01)
*G06T 1/20* (2006.01)
*H04N 13/275* (2018.01)

(52) U.S. Cl.
CPC .............. *G06T 15/005* (2013.01); *G06T 1/20* (2013.01); *H04N 13/275* (2018.05)

(58) Field of Classification Search
None
See application file for complete search history.

(56) References Cited

U.S. PATENT DOCUMENTS

| 10,217,286 | B1 | 2/2019 | Angel et al. |
| 10,587,871 | B2 | 3/2020 | Champion et al. |
| 2008/0007559 | A1 | 1/2008 | Kalaiah et al. |
| 2012/0235999 | A1 | 9/2012 | Bi et al. |
| 2015/0156480 | A1* | 6/2015 | Hamagishi ............. H04N 13/31 348/51 |
| 2015/0287166 | A1* | 10/2015 | Cerny ..................... G06T 17/20 345/423 |
| 2018/0293041 | A1 | 10/2018 | Harviainen |
| 2019/0272664 | A1 | 9/2019 | Kinross et al. |
| 2021/0049360 | A1* | 2/2021 | Yildiz ................... G02B 27/017 |
| 2024/0070959 | A1 | 2/2024 | Foda |

FOREIGN PATENT DOCUMENTS

| CN | 109819231 A | 5/2019 |
| TW | M642781 U | 6/2023 |
| WO | 2021/081568 A1 | 4/2021 |
| WO | 2021/146978 A1 | 7/2021 |

OTHER PUBLICATIONS

Chinese language office action dated Mar. 18, 2024, issued in application No. TW 111145392.
Extended European Search Report dated Jul. 13, 2023, issued in application No. EP 22198187.1.

* cited by examiner

*Primary Examiner* — Frank S Chen
(74) *Attorney, Agent, or Firm* — McClure, Qualey & Rodack, LLP

(57) ABSTRACT

A computer device for three-dimensional (3D) scene generation is provided. The computer device includes a graphics processing unit (GPU), and a processing unit coupled to the GPU. The GPU is configured to receive instructions from a graphics driver. The processing unit is configured to run the graphics driver and the application program. The processing unit is further configured to run a first program to intercept the first function calls sent from the application program to the graphics driver, to create the second function calls each corresponding to the first function calls based on interpupillary distance, and to transmit the first function calls and the second function calls to the graphics driver. The GPU is configured to render a first image according to the first function calls and to render a second image according to the second function calls.

12 Claims, 6 Drawing Sheets

METHOD AND COMPUTER DEVICE FOR 3D SCENE GENERATION

BACKGROUND OF THE INVENTION

Field of the Invention

The present disclosure relates in general to image processing techniques, and it relates particularly to three-dimensional (3D) scene generation.

Description of the Related Art

The technologies used in 3D graphics have been maturing along with the market demand for years. In general, images with a 3D effect (i.e., 3D scenes), such as in games, movies, videos, etc., are more visually appealing than conventional 2D images.

However, the cost of developing such 3D visual entertainment applications can be higher, and displaying 3D scenes may require vast processing power and other computing resources. Furthermore, 3D scenes can overstimulate some viewers' vision and cause minor discomfort, or even daze some viewers who are not used to viewing images with a 3D effect. Therefore, based on cost-benefit considerations, the majority of popular applications are still designed to be displayed in 2D patterns.

Undeniably, the feeling of novelty and the user experience of many viewers will improve if such popular applications could be displayed in 3D patterns despite their original 2D-based design. It would therefore be very desirable to have a method and a computer device for generating 3D scenes for 2D-based applications.

BRIEF SUMMARY OF THE INVENTION

A computer device for three-dimensional (3D) scene generation is provided by an embodiment of the present disclosure. The computer device includes a graphics processing unit (GPU), and a processing unit coupled to the GPU. The GPU is configured to receive instructions from a graphics driver. The processing unit is configured to run the graphics driver and the application program. The processing unit is further configured to run a first program to intercept the first function calls sent from the application program to the graphics driver, to create the second function calls each corresponding to the first function calls based on interpupillary distance, and to transmit the first function calls and the second function calls to the graphics driver. The GPU is configured to render a first image according to the first function calls and to render a second image according to the second function calls.

In some embodiments, the GPU is further configured to generate the stereo image based on the first image and the second image, and to send the stereo image to an autostereoscopic display device to display the stereo image. In other embodiments, the GPU is further configured to send the first image and the second image to a wearable device that includes a first display panel and a second display panel for displaying the first image and the second image, respectively.

In some embodiments, each of the first function calls and the corresponding second function call use the same function provided by a graphics application interface, but use different input parameters.

In some embodiments, the interpupillary distance is the average distance between the centers of the pupils of human eyes.

In some embodiments, the application program is programmed to send the function calls to the graphics driver, and the first function calls that are intercepted are those associated with the geometric properties of the objects in the first image.

In some embodiments, the processing unit is further configured to run a second program to intercept the shading command sent from the application program to the graphics driver, to identify faulty shaders that need to be replaced, to modify the shading command by replacing the shader IDs of the faulty shaders with the shader IDs of fixed shaders, to transmit the modified shading command to the graphics driver, and to cause the graphics driver to apply the fixed shaders instead of the faulty shaders needing replacement.

A method for three-dimensional (3D) scene generation is provided by an embodiment of the present disclosure. The method is executed by a computer device. The method includes the following tasks. Intercepting the first function calls sent from an application program to a graphics driver. Creating the second function calls, each corresponding to the first function calls based on interpupillary distance. Transmitting the first function calls and the second function calls to the graphics driver. Rendering the first image according to the first function calls. Rendering the second image according to the second function calls.

In some embodiments, the method further includes the following tasks. Generating an stereo image based on the first image and the second image. Sending the stereo image to an autostereoscopic display device to display it. In other embodiments, the method further includes sending the first image and the second image to a wearable device that includes a first display panel and a second display panel, which respectively display the first image and the second image.

In some embodiments, the method further includes the following tasks. Intercepting the shading command sent from the application program to the graphics driver. Identifying which shaders are faulty and need to be replaced. Modifying the shading command by replacing the shader IDs of the fauty shaders with the shader IDs of fixed shaders. Transmitting the modified shading command to the graphics driver and causing the graphics driver to apply the fixed shaders instead of the faulty shaders that need replacement.

BRIEF DESCRIPTION OF THE DRAWINGS

The present disclosure can be better understood by reading the subsequent detailed description and examples with references made to the accompanying drawings. Additionally, it should be appreciated that in the flow diagram of the present disclosure, the order of execution for each blocks can be changed, and/or some of the blocks can be changed, eliminated, or combined.

DETAILED DESCRIPTION OF THE INVENTION

The following description provides embodiments of the invention, which are intended to describe the basic spirit of the invention, but is not intended to limit the invention. For the actual inventive content, reference must be made to the scope of the claims.

In each of the following embodiments, the same reference numbers represent identical or similar elements or components.

It must be understood that the terms "including" and "comprising" are used in the specification to indicate the existence of specific technical features, numerical values, method steps, process operations, elements and/or components, but do not exclude additional technical features, numerical values, method steps, process operations, elements, components, or any combination of the above.

Ordinal terms used in the claims, such as "first," "second," "third," etc., are only for convenience of explanation, and do not imply any precedence relation between one another.

Figure 1A:
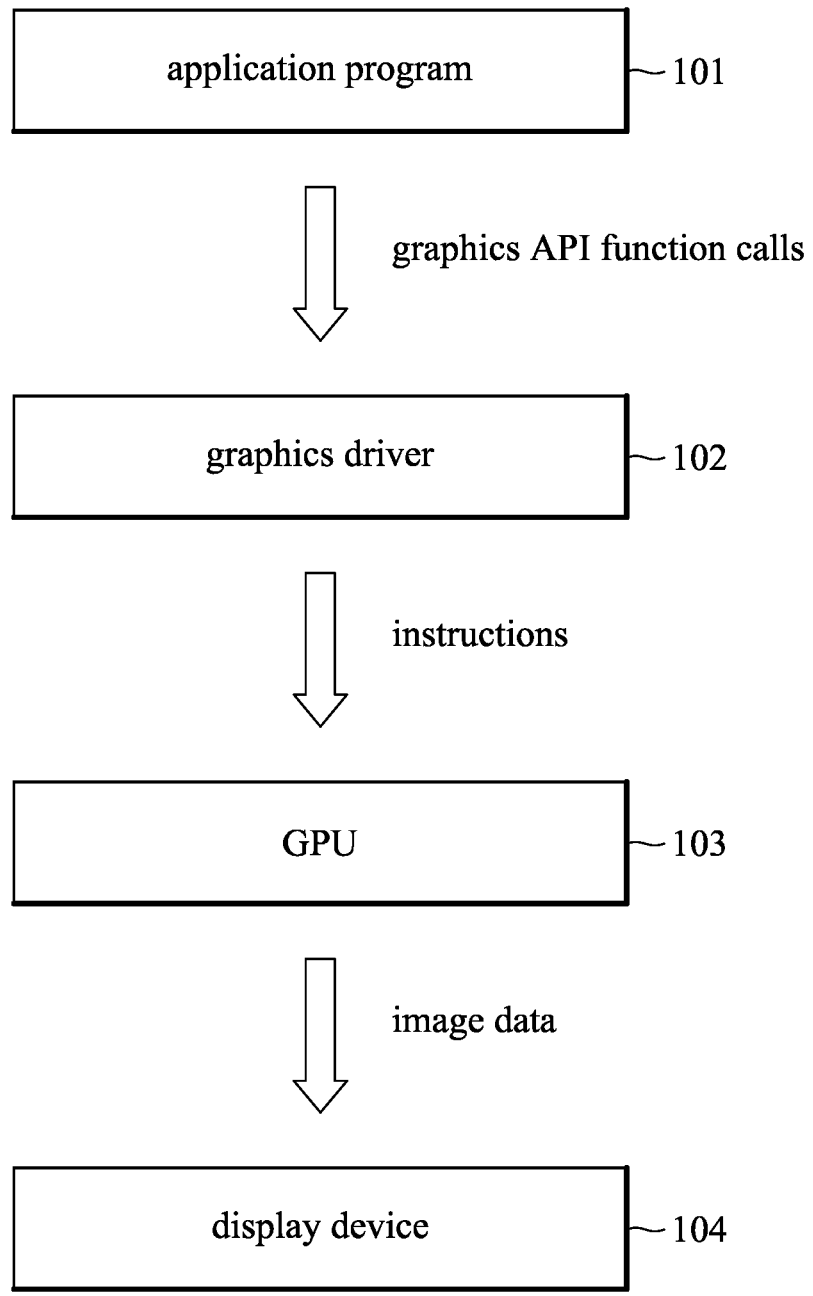
FIG. 1A is a schematic block diagram illustrating the conventional flow of generating and displaying scenes for an application program by a computer device, according to an embodiment of the present disclosure.

FIG. 1A is a schematic block diagram illustrating the conventional flow of generating and displaying scenes for an application program by a computer device. As shown in FIG. 1A, it is required to go through a graphics driver layer (i.e., graphics driver 102) and a graphics processing unit (GPU) layer (i.e., GPU 103) for the scenes of the application program 101 to be eventually displayed on the display device 104.

The application program 101 may be any software program providing visualized images or scenes to viewers, such as games, video/multimedia player programs, web browsers (e.g., when the viewer is using it to watch a video on an online video platform such as YouTube, or on a social media such as Twitter), photo viewing programs, or other visual entertainment applications.

The GPU 103 is a specialized electronic circuit designed to execute computer graphics computing and image processing, for offloading the general-purpose central processing unit (CPU). The GPU 103 is thus more efficient than the general-purpose CPU for computer graphics computing and image processing.

The graphics driver 102 is a set of software programs allowing the operating system (e.g., Windows, Linux, MacOS, etc.), on which the application program 101 is installed, to communicate with the GPU 103.

The display device 104 may be any device for displaying visualized information, such as liquid-crystal display (LCD), light-emitting diode (LED) display, organic light-emitting diode (OLED) display, plasma display, etc. In 3D display or virtual reality (VR) scenarios, the display device 104 can be an autostereoscopic display device, or a wearable device such as 3D/VR glasses and headgears.

During execution, the application program 101 sends function calls to the graphics driver 102, in order to request the GPU to render the image of the application program 101. The called functions are typically provided by a graphics application interface (API), such as DirectX (for Microsoft Windows), OpenGL (cross-platform), Glide (cross-platform), Metal (for MacOS or iOS), Vulkan (cross-platform), etc. In response to receiving the function calls, the graphics driver 102 converts them into lower-level instructions that are comprehensible for the GPU 103, and then sends the instructions to the GPU 103. In response to receiving the instructions from the graphics driver 102, the GPU 103 renders image using the called functions and the input parameters thereof. The rendered image are thus sent to the display device 104 to display the scene.

Figure 1B:
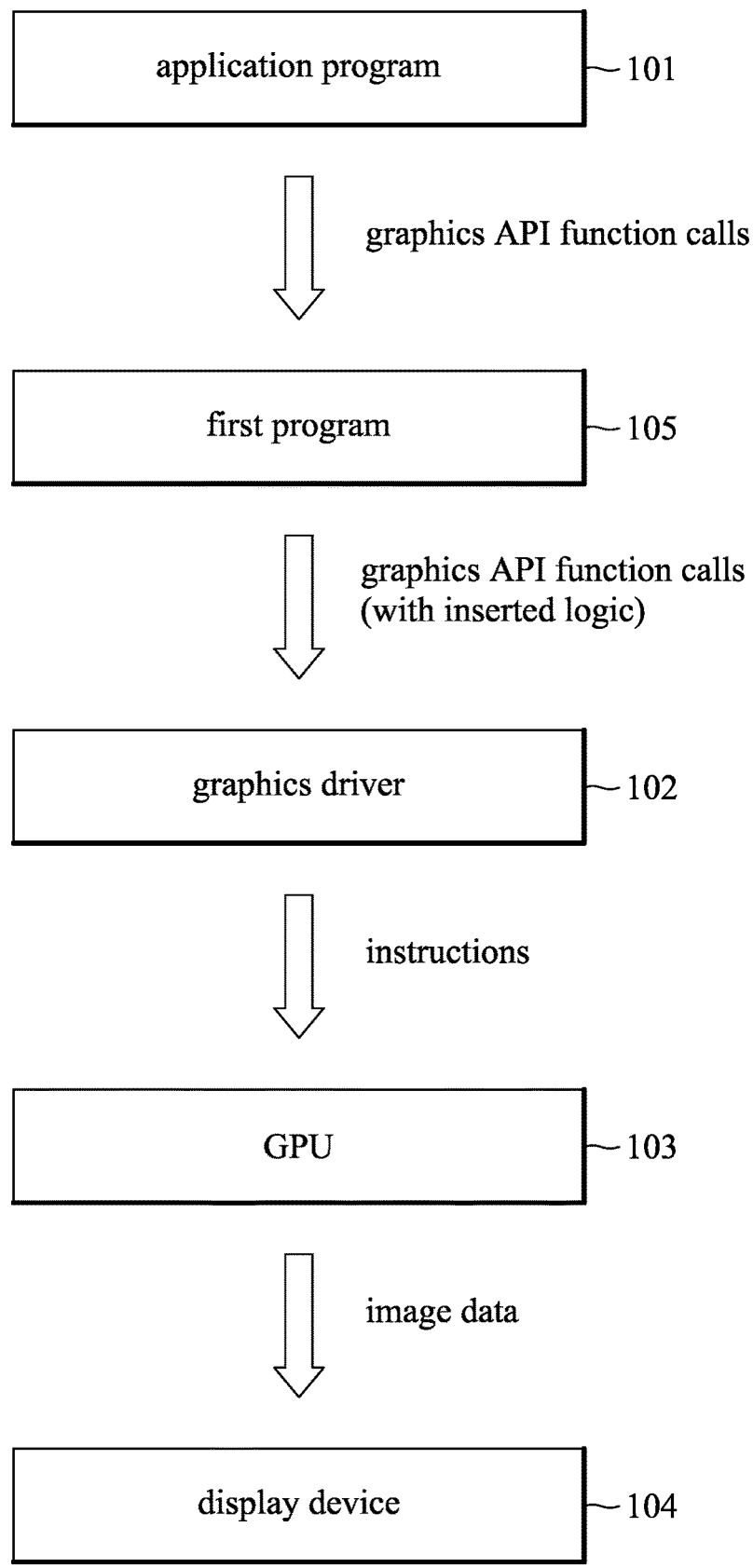
FIG. 1B is a schematic block diagram illustrating the flow of generating and displaying scenes for an application program by a computer device, according to an embodiment of the present disclosure.

FIG. 1B is a schematic block diagram illustrating the flow of generating and displaying scenes for an application program by a computer device, according to an embodiment of the present disclosure. The difference between FIG. 1A and FIG. 1B is that there is an additional layer, the first program 105, between the application program 101 and the graphics driver 102.

The first program 105 is designed for intercepting the function calls sent from the application program 101, inserting additional logic for calling functions, and transmitting the function calls with the inserted logic to the graphics driver 102. In an embodiment, the insertion of the additional logic can be carried out by allocating memory in the address space of the process of the application program 101 to store additional codes in a dynamic-link library (DLL). There are multiple alternative ways, however, to implement the insertion of the additional logic. The present disclosure is not limited to the implementations of the insertion of the additional logic. The instructions sent from the graphics driver 102 to the GPU 103 are converted from the function calls with inserted logic, instead of the original function calls sent from the application program 101. Therefore, even if the application program requests the GPU to render the image of the application program 101 with 2D-based logic, the GPU may eventually render the image of the application program 101 with 3D-based logic instead as the first program 105 requested. The logic of the first program 105 is described in more detail below.

Figure 2:
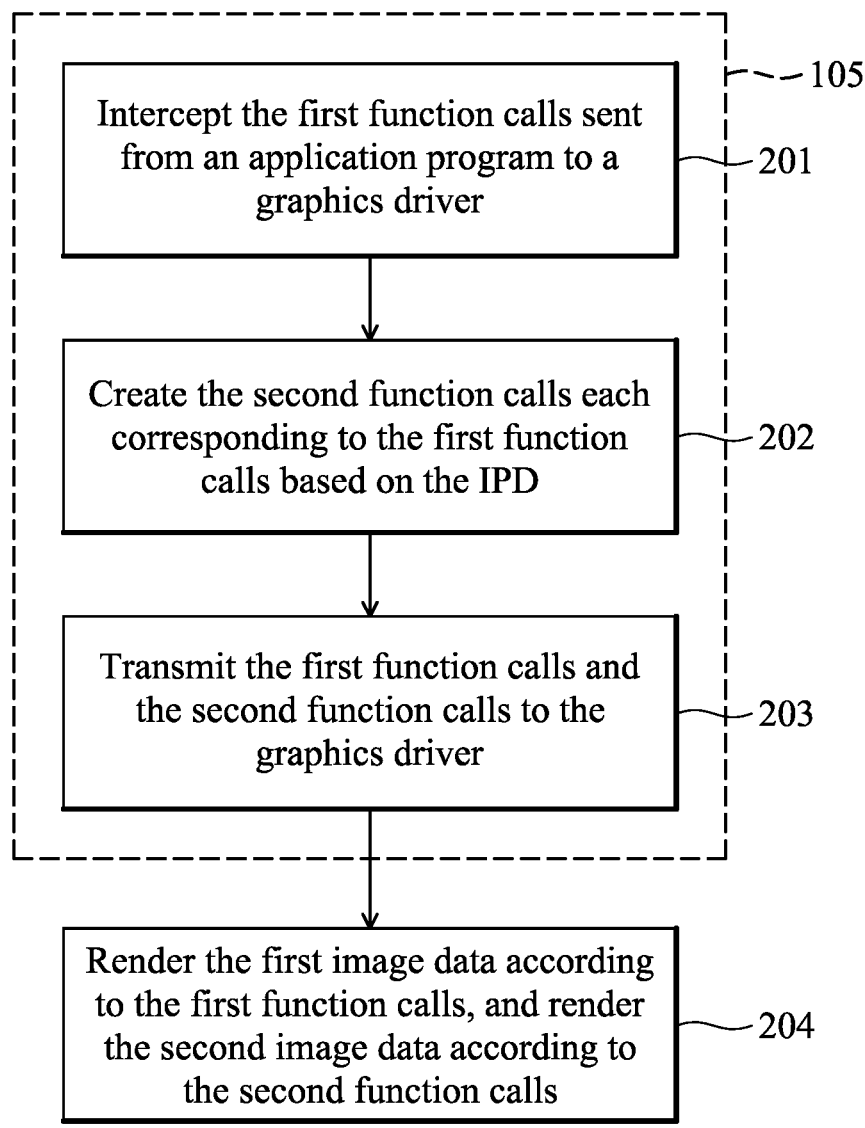
FIG. 2 is the flow diagram of the method for 3D scene generation, according to an embodiment of the present disclosure.

FIG. 2 is the flow diagram of the method 200 for 3D scene generation, according to an embodiment of the present disclosure. The method 200 may be executed by a computer device. As shown in FIG. 2, the method 200 includes steps 201-204, in which steps 201-203 may be executed by the processing unit of the computer device through running a first program (e.g., the first program 105 in FIG. 1B), and step 204 may be executed by the GPU (e.g., the GPU 103 in FIG. 1B) of the computer device.

The method 200 starts at step 201. In step 201, the first function calls sent from the application program (e.g., the application program 101 in FIG. 1B) to the graphics driver (e.g., the graphics driver 102 in FIG. 1B) are intercepted. Then, the method 200 proceeds to step 202.

In step 202, second function calls each corresponding to the first function calls are created based on the interpupillary distance (IPD). Then, the method 200 proceeds to step 203.

The IPD is the distance measured in millimeters between the centers of the pupils of the eyes. This IPD is different from person to person. In an embodiment, the IPD used in step 202 is the average distance between the centers of pupils of humans, and is a predetermined value (e.g., 63 millimeters, but the present disclosure is not limited thereto) set by default in different regions. In another embodiment, the IPD is adjustable for viewers when the application program is running. For example, the viewer is allowed to use hotkeys to increase or decrease the default IPD settings. In other embodiments, the IPD used in step 202 can be the actual IPD of the viewer estimated by the computer device. For example, the estimation of the actual IPD can be carried out by using a camera device mounted on the display device to capture the image containing the viewer's face, then estimating the IPD based on the relationship between size of viewer's face and distance of IPD in the captured image. In another embodiment, the IPD can be estimated based on other information in the captured image, such as the size of viewer's face, the distance of the IPD in the captured imaged, and the distance between the viewer and device.

In an embodiment, the first function call and the corresponding second function call use the same function provided by a graphics application interface, but use different input parameters. For example, assuming that the application program (e.g., the application program 101 in FIG. 1B) requests the GPU (e.g., the GPU 103 in FIG. 1B) to draw a circle by calling a DrawCircle( ) function as follows:

```
public void DrawCircle(
int x1,
int y1,
int radius
);
``` in which the integer parameters x1 and y1 are the x-axis coordinate and the y-axis coordinate of the center of the circle respectively, indicating the position of the circle on the scene for one eye, and the integer parameter radius is the length of any of line segments from the center of the circle to the perimeter of the circle. In step 201, this function call (i.e., the first function call), including the function DrawCircle( ) and the parameters (i.e., x1, y1, and radius) within, is intercepted. In step 202, the corresponding second function call is created as follows:

```
public void DrawCircle(
int x2,
int y2,
int radius
);
``` in which the integer parameters x2 and y2 are the x-axis coordinate and the y-axis coordinate of the center of the circle respectively, indicating the position of the circle on the scene for the other eye, just like the previously described x1 and x2 of the first function call except that the values are different. In this example, the integer parameter radius of the second function call is assumed to be the same with the radius of the first function call, but the present disclosure is not limited thereto. The value of x2 and y2 are calculated based on x1, y1, and the IPD. In an embodiment, the value of x2 and y2 can be calculated by using a transformation matrix to carry out matrix multiplication to the coordinate matrix of x1 and x2. Some of the entries of the transformation matrix can be function of IPD. The transformation can be either linear or non-linear. In another embodiment, the y1 and y2 are equal to each other because both eyes of the viewer are in the same vertical height. In view of the description in this paragraph, the first original image is drawn for the first eye (e.g., the left eye), and the second image is drawn for the second eye (e.g., the right eye) with a shift from the first image. The shift is calculated using a projection matrix (transformation matrix) and an algorithm based on IPD. The mathematical algorithm or formulas for calculating the coordinate of the objects to be rendered is not limited by the present disclosure.

Please refer back to FIG. 2. In step 203, the first function calls and the second function calls are transmitted to the graphics driver (e.g., the graphics driver 102 in FIG. 1B). Then, the method 200 proceeds to step 204.

In step 204, the first image is rendered according to the first function calls, and the second image is rendered according to the second function calls. The first image and the second image can be regarded as the image to be displayed to the left eye and the right eye respectively. In other words, the first image can be regarded as the image for the left eye while the second image can be regarded as the image for the right eye, and vice versa. The first image is basically the same with the original image the GPU would render, which is probably monoscopic, without the method 200 being adopted. The second image additionally created as a result of adopting the method 200 enables displaying a 3D scene instead of the monoscopic 2D image.

Depending on the type of the display device, the first image and the second image will be directly sent to the display device, or they will further go through an interlacing (or weaving) process. Two exemplary scenarios in which the type of display device is different are illustrated in FIG. 3 and FIG. 4 and discussed in more detail below.

Figure 3:
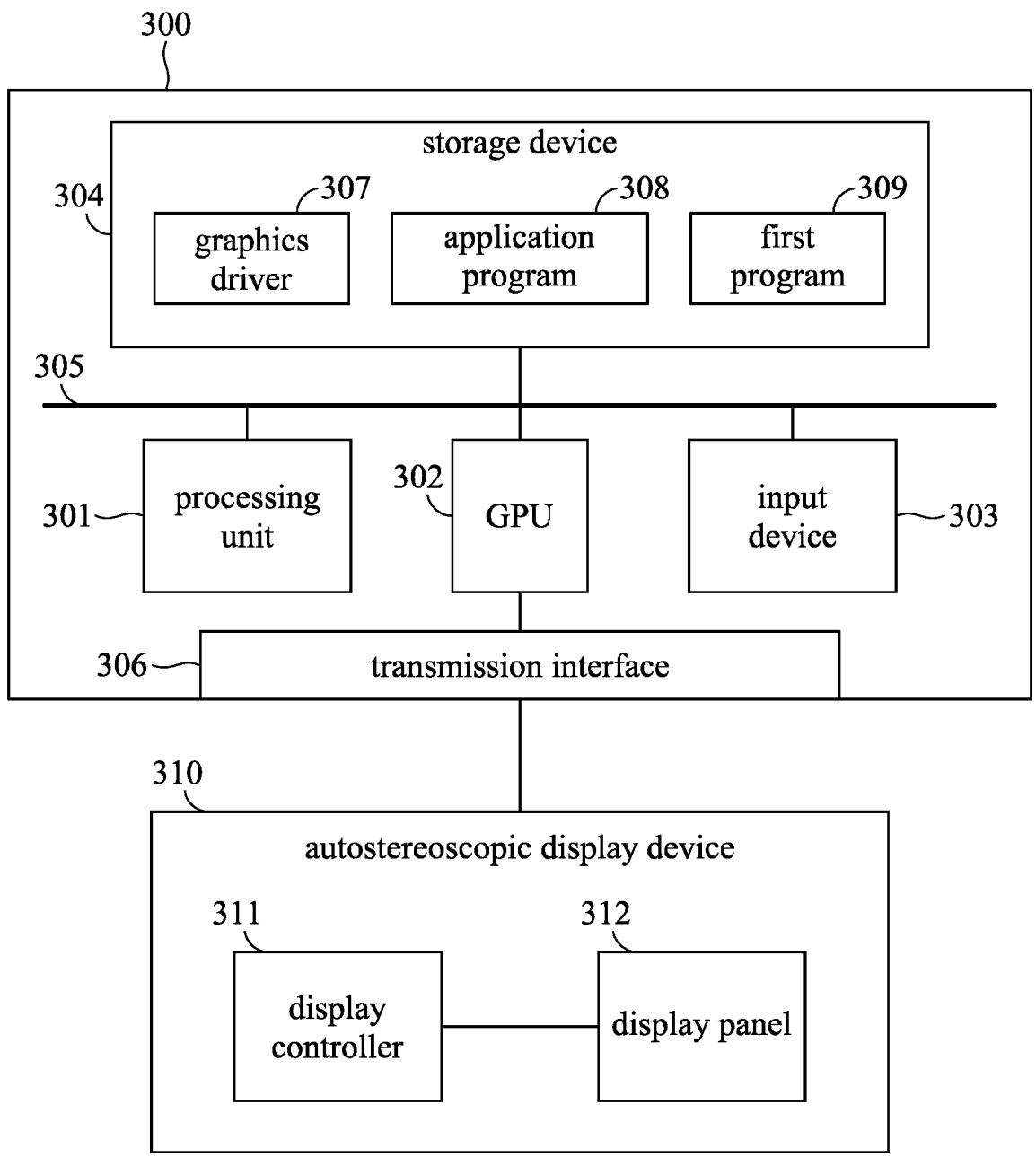
FIG. 3 is a schematic block diagram illustrating a scenario of 3D scene generation and display in which the display device is an autostereoscopic display device, according to an embodiment of the present disclosure.
Figure 4:
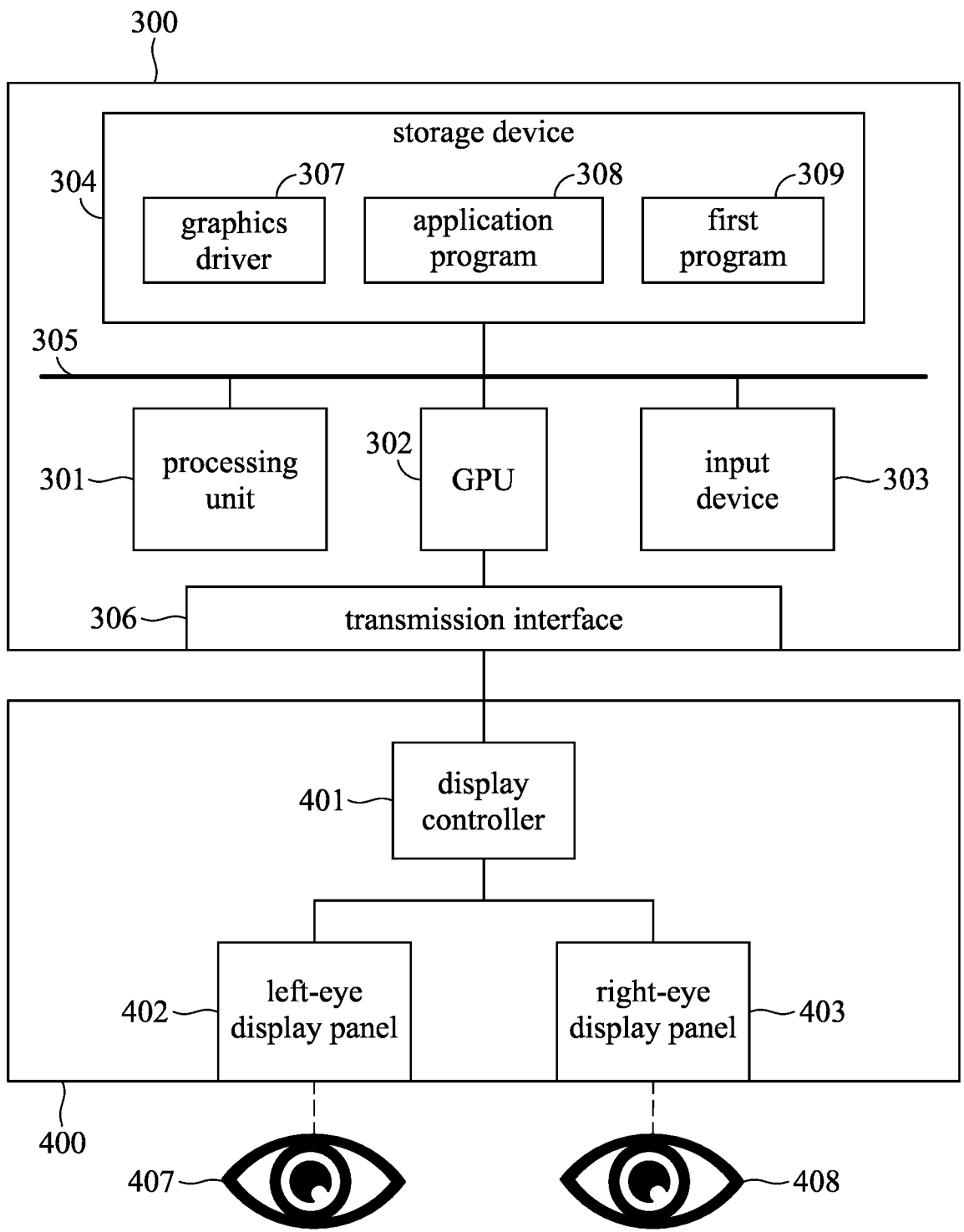
FIG. 4 is a schematic block diagram illustrating a scenario of 3D scene generation and display in which the display device is a wearable device, according to another embodiment of the present disclosure.

FIG. 3 is a schematic block diagram illustrating a scenario of 3D scene generation and display in which the display device is an autostereoscopic display device, according to an embodiment of the present disclosure. As shown in FIG. 3, elements such as the processing unit 301, the GPU 302, the input device 303, and the storage device 304 are included in the computer device 300, and they are coupled to each other through the system bus 305.

The computer device 300 is an electronic device capable of the execution of computational tasks, such as a personal computer (including desktop computer, notebook computer, and tablet computer), or a server computer.

The processing unit 301 may be, for example, a central processing unit (CPU), a general-purpose processor, or the like, but the present disclosure is not limited thereto. The processing unit 301 is configured to run the graphics driver 307 and the application program 308 stored in the storage device 304. According to the embodiments of the present disclosure, the processing unit 301 is further configured to run the first program 309 stored in the storage device 304 to execute steps 201-203 of the method 200 in FIG. 2.

The GPU 302 may be, for example, a specialized electronic circuit in a display card (not shown in FIG. 3) or integrated into the processing unit 301. According to the embodiments of the present disclosure, the GPU 302 is configured to execute step 204 of the method 200 in FIG. 2.

The input device 303 may include any device that is able to receive control commands from viewers, such as a keyboard, a mouse, and a touch panel, but the present disclosure is not limited thereto. In an embodiment, the input device 303 allows the viewer to enable/disable the 3D scene, in other words, allows the viewer to switch between the 2D mode and the 3D mode of the display. The method 200 will only be executed in the 3D mode, and it will not be executed in the 2D mode. In another embodiment, the input device 303 allows the viewer to adjust (increase or decrease) the IPD.

The storage device 304 is a non-volatile memory device, such as a hard disk drive, a solid-state disk, a flash memory, or a read-only memory, but the present disclosure is not limited thereto. According to the embodiments of the present disclosure, the storage device 304 is used for storing the graphics driver 307, the application program 308, and the first program 309.

The graphics driver 307, the application program 308, and the first program are respectively identical or similar to the graphics driver 102, the application program 101, and the first program 105 in FIG. 1B, which have been described above and thus the descriptions are not repeated herein.

In the exemplary scenario of FIG. 3, since the display device is the autostereoscopic display device 310 which presents both the left eye image and the right eye image (i.e., the first image and the second image as previously described) in the same screen, the GPU 302 is further configured to execute an interlacing process to generate an stereo image based on the first image and the second image. After generating the stereo image, the GPU 302 sends the stereo image to the autostereoscopic display device 310 through the transmission interface 306.

The transmission interface 306 may include wired transmission interfaces and/or wireless transmission interfaces. The wired transmission interfaces may include High Definition Multimedia Interface (HDMI), DisplayPort (DP) interface, embedded display Port (eDP) interface, Universal Serial Bus (USB) interface, USB Type-C interface, Thunderbolt interface, Digital Video Interface (DVI), or the combination thereof. The wireless transmission interface may include fifth generation (5G) wireless system, Bluetooth, WiFi, Near Field Communication (NFC) interface, etc., but the present disclosure is not limited thereto.

The autostereoscopic display device 310 is a display device capable of displaying stereoscopic images without the use of a wearable device (such as 3D/VR glasses or headgear) for the viewer. The autostereoscopic display device 310 may include a display controller 311 and a display panel 312. The display controller 311 is used for switching the display modes (e.g., the 2D mode and 3D mode that are allowed for viewers to switch between through the input device 303, as previously described) of the display panel 312 according to the display mode control signal from the computer device 300. The display panel 320 can achieve the effect of autostereoscopic vision using any suitable autostereoscopic technology in the field of the present disclosure, such as parallax barrier, lenticular lenses, directional backlight, integral imaging, etc., the details of which will not be elaborated here. Thereby, a 3D scene of the application program can be presented to the viewer by displaying the stereo image on the display panel, in response to the stereo image being received by the autostereoscopic display device 310.

FIG. 4 is a schematic block diagram illustrating a scenario of 3D scene generation and display in which the display device is a wearable device (such as 3D/VR glasses or headgear), according to another embodiment of the present disclosure. The structure of the computer device 300 in FIG. 4 is substantially identical to the structure of the computer device 300 in FIG. 3, except that the GPU 302 in FIG. 4 directly sends the first image for the left eye 407 and the second image for the right eye 408 (or the first image for the right eye 408 and the second image for the left eye 407) to the wearable device 400 without executing the interlacing process. As shown in FIG. 4, the wearable device 400 may include the display controller 401, the left-eye display panel 402, and the right-eye display panel 403.

The display controller 401 can be, for example, an application-specific integrated circuit (ASIC), a system-on-chip (SoC), a processor, or a microcontroller, but the present disclosure is not limited thereto.

The left-eye display panel 402 and the right-eye display panel 403 can be, for example, a liquid crystal panel, a light-emitting diode panel, an organic light-emitting diode panel, etc., but the present disclosure is not limited thereto. In some embodiments, the left-eye display panel 402 and the right-eye display panel 403 may be different and separate display panels, or implemented by the same display panel, and the left-eye display panel 402 and the right-eye display panel 403 are side-by-side and parallel, there is no angular difference between the two. In other embodiments, the left-eye display panel 402 and the right-eye display panel 403 are side-by-side and not parallel, and there is an angular difference between the two.

The first image and the second image are alternately played on the left-eye display panel 402 and the right-eye display panel 403. For example, when playing the first image on the left-eye display panel 402, the right eye 408 of the viewer will be obscured. When playing the second image on the right-eye display panel 403, the left eye 407 of the viewer will be obscured. The viewer's vision system automatically form a stereoscopic vision by combining the images received by the two eyes at successive time. Thanks to the persistence of vision, as long as the frequency of the left eye image and the right eye image being replaced is fast enough, the viewer will not notice that the scene in front of the eye is obscured at certain time.

In some embodiments, the first function calls intercepted in step 201 of the method 200 in FIG. 2 are not all of the function calls sent from the application program (e.g., the application program 101 in FIG. 1B) to the graphics driver (e.g., the graphics driver 102 in FIG. 1B), but just a few of the function calls; specifically, those that are associated with the geometric properties of the objects in the first image. The geometric properties may include the shape, size, and position of the object in the scene.

In some embodiments, the application program (e.g., the application program 101 in FIG. 1B) further sends a shading command to the graphics driver (e.g., the graphics driver 102 in FIG. 1B) to request the GPU (e.g., the GPU 103 in FIG. 1B) to load a plurality of shaders. The shading command includes the identifiers (IDs) of these shaders. A shader is a computer program that performs the shading process, which is a part of the whole rendering process, for calculating how the color and brightness of a surface varies with lighting. When the first program (e.g., the first program 105 in FIG. 1B) and a specific application program are both running, these shaders may have a chance to conflict with the additional second function calls generated by the first program, and thus fails to perform the shading process. The faulty shaders may eventually result in a variety of abnormalities, such as distortion and hollow areas of the scene viewed by the viewer. Therefore, in some embodiments, a faulty shader will be replaced with a fixed shader, which can be provided by, for example, the developer of the application program or the manufacturer of the computer device. Additionally, the processing unit (e.g., the processing unit 301 in FIG. 3 and FIG. 4) may further run a second program to cause the GPU to load the fixed shader instead of the failed one. A list of the shader IDs of faulty shaders and the corresponding fixed shaders for the specific application program may be maintained and stored in the storage device, such as storage device 304 in FIG. 3 and FIG. 4, so that the second program can use the list to identify the faulty shaders from all the shaders that the application program requests the GPU to load. Like the first program, the second program can also be stored in the storage device, such as storage device 304 in FIG. 3 and FIG. 4. The logic of the second program is described in more detail below.

It should be noted that who fixes the faulty shader and how the faulty shader is fixed are not limited by the present disclosure. Furthermore, the second program can be a program separated from the first program, or it can be a part of the first program, and the present disclosure is not limited thereto.

Figure 5:
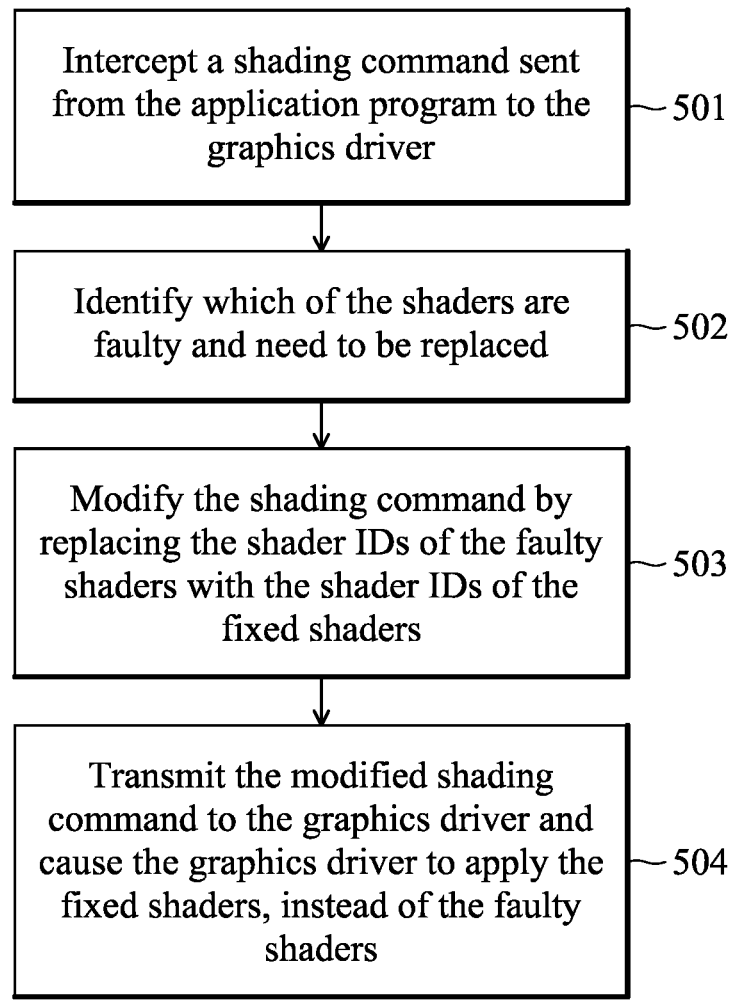
FIG. 5 is a flow diagram illustrating the method for replacing the faulty shader, according to an embodiment of the present disclosure.

FIG. 5 is a flow diagram illustrating the method 500 for replacing the faulty shader, according to an embodiment of the present disclosure. As shown in FIG. 5, the method 500 includes steps 501-504.

In step 501, the shading command sent from the application program (e.g., the application program 101 in FIG. 1B) to the graphics driver (e.g., the graphics driver 102 in FIG. 1B) are intercepted. The shading command includes the shader IDs of a plurality of shaders for requesting the GPU to load the shaders. Then, the method 500 proceeds to step 502.

In step 502, the faulty shaders that need to be replaced (i.e., the faulty shaders) are identified, using the list of shader IDs of the faulty shaders and the corresponding fixed shaders for the specific application program. Then, the method 500 proceeds to step 503.

In step 503, the shading command is modified by replacing the shader IDs of the faulty shaders with the shader IDs of fixed shaders. Then, the method 500 proceeds to step 503.

In step 504, the modified shading command is transmitted to the graphics driver. The fixed shaders, instead of the shaders needing replacement (i.e., the faulty shaders), are thus applied by the graphics driver.

The steps of the methods and algorithms provided in the present disclosure may be directly applied to a hardware and a software module or a combination thereof by executing a processor. A software module (including executing instructions and related data) and other data may be stored in a data memory, such as random access memory (RAM), flash memory, read-only memory (ROM), erasable programmable read only memory (EPROM), electrically erasable programmable read only memory (EEPROM), registers, hard drives, portable drives, CD-ROM, DVD, or any other computer-readable storage media format in the art. For example, a storage media may be coupled to a machine device, such as a computer/processor (denoted by "processor" in the present disclosure, for the convenience of explanation). The processor may read information (such as codes) from and write information to a storage media. A storage media may integrate a processor. An application-specific integrated circuit (ASIC) includes the processor and the storage media. A viewer apparatus includes an ASIC. In other words, the processor and the storage media are included in the viewer apparatus without directly connecting to the viewer apparatus. Besides, in some embodiments, any product suitable for computer programs includes a readable storage media, wherein the storage media includes codes related to one or more disclosed embodiments. In some embodiments, the computer program product may include packaging materials.

The computer device and the method provided by the present disclosure enable the display of 3D scenes from 2D-based applications, and thereby allow to further improve the feeling of novelty and the user experience of viewers. Through calling the same function call twice to create scene for both eyes of the viewer, stereo images can be generated rather easily without needing to rewrite or modify the source code of the application program.

The above paragraphs are described with multiple aspects. Obviously, the teachings of the specification may be performed in multiple ways. Any specific structure or function disclosed in examples is only a representative situation. According to the teachings of the specification, it should be noted by those skilled in the art that any aspect disclosed may be performed individually, or that more than two aspects could be combined and performed.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A computer device for three-dimensional (3D) scene generation, comprising:
    a graphics processing unit (GPU), configured to receive instructions from a graphics driver; and
    a processing unit, coupled to the GPU, configured to run the graphics driver and an application program;
    wherein the processing unit is further configured to run a first program to execute the following operations:
    intercepting a plurality of first function calls sent from the application program to the graphics driver;
    creating a plurality of second function calls each corresponding to the first function calls based on interpupillary distance by using the same function provided by a graphics application interface and different input parameters; and
    transmitting the first function calls and the second function calls to the graphics driver;
    wherein the GPU is configured to render a first image according to the first function calls and to render a second image according to the second function calls;
    wherein the first image is the same as an original image rendered according to the first function calls not being intercepted.

2. The computer device as claimed in claim 1, wherein the GPU is further configured to generate a stereo image based on the first image and the second image, and to send the stereo image to an autostereoscopic display device to display the stereo image.

3. The computer device as claimed in claim 1, wherein the GPU is further configured to send the first image and the second image to a wearable device that includes a first display panel and a second display panel for displaying the first image and the second image, respectively.

4. The computer device as claimed in claim 1, wherein the interpupillary distance is an average distance between centers of humans' pupils.

5. The computer device as claimed in claim 1, wherein the application program is programmed to send a plurality of function calls to the graphics driver, and the first function calls that are intercepted are among the function calls associated with geometric properties of objects in the first image.

6. The 3D rendering device as claimed in claim 1, wherein the processing unit is further configured to run a second program to execute the following operations:
    intercepting a shading command sent from the application program to the graphics driver, wherein the shading command comprises a plurality of shader IDs of a plurality of shaders for requesting the GPU to load the shaders;

identifying which of the shaders are faulty and need to be replaced;
modifying the shading command by replacing the shader IDs of the faulty shaders with the shader IDs of fixed shaders;
transmitting the modified shading command to the graphics driver and causing the graphics driver to apply the fixed shaders instead of the faulty shaders needing replacement.

7. A method for three-dimensional (3D) scene generation, executed by a computer device, comprising:
intercepting a plurality of first function calls sent from an application program to a graphics driver;
creating a plurality of second function calls each corresponding to the first function calls based on interpupillary distance by using the same function provided by a graphics application interface and different input parameters;
transmitting the first function calls and the second function calls to the graphics driver; and
rendering a first image according to the first function calls, and rendering a second image according to the second function calls;
wherein the first image is the same as an original image rendered according to the first function calls not being intercepted.

8. The method as claimed in claim 7, further comprising:
generating a stereo image based on the first image and the second image, and sending the stereo image to an autostereoscopic display device to display the stereo image.

9. The method as claimed in claim 7, further comprising:
sending the first image and the second image to a wearable device including a first display panel and a second display panel for displaying the first image and the second image, respectively.

10. The method as claimed in claim 7, wherein the interpupillary distance is an average distance between centers of humans' pupils.

11. The method as claimed in claim 7, wherein the application program is programmed to send a plurality of function calls to the graphics driver, and the first function calls that are intercepted are among the function calls associated with geometric properties of objects in the first image.

12. The method as claimed in claim 7, further comprising:
intercepting a shading command sent from the application program to the graphics driver, wherein the shading command comprises a plurality of shader IDs of a plurality of shaders for requesting a GPU to load the shaders;
identifying which of the shaders are faulty and need to be replaced;
modifying the shading command by replacing the shader IDs of the faulty shaders with the shader IDs of fixed shaders; and
transmitting the modified shading command to the graphics driver and causing the graphics driver to apply the fixed shaders instead of the faulty shaders needing replacement.

* * * * *